United States Patent
Papakonstantinou et al.

(10) Patent No.: US 11,609,910 B1
(45) Date of Patent: Mar. 21, 2023

(54) AUTOMATICALLY REFRESHING MATERIALIZED VIEWS ACCORDING TO PERFORMANCE BENEFIT

(71) Applicant: Amazon Technologies, Inc., Seattle, WA (US)

(72) Inventors: Yannis Papakonstantinou, La Jolla, CA (US); Vuk Ercegovac, Campbell, CA (US); Gaurav Saxena, Cupertino, CA (US); Balakrishnan Narayanaswamy, San Jose, CA (US); Enrico Siragusa, Berlin (DE); Mario Guerriero, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,408

(22) Filed: Dec. 10, 2020

(51) Int. Cl.
*G06F 16/00* (2019.01)
*G06F 16/2453* (2019.01)
*G06F 16/23* (2019.01)

(52) U.S. Cl.
CPC .... *G06F 16/24539* (2019.01); *G06F 16/2379* (2019.01); *G06F 16/24544* (2019.01)

(58) Field of Classification Search
CPC ......... G06F 16/24535; G06F 16/24537; G06F 16/24532; G06F 16/278; G06F 16/24539; G06F 16/24561; G06F 16/2393; G06F 16/2379; G06F 16/24544
See application file for complete search history.

(56) References Cited

U.S. PATENT DOCUMENTS

| | | | |
|---|---|---|---|
| 5,535,385 A | 7/1996 | Griffin et al. | |
| 6,205,451 B1 | 3/2001 | Norcott et al. | |
| 6,882,993 B1 | 4/2005 | Lawande et al. | |
| 6,889,231 B1 | 5/2005 | Souder et al. | |
| 2003/0088541 A1* | 5/2003 | Zilio | G06F 16/22 |
| 2005/0114307 A1* | 5/2005 | Li | G06F 16/24539 |
| 2005/0235004 A1* | 10/2005 | Folkert | G06F 16/2393 |
| 2012/0209807 A1* | 8/2012 | Li | G06F 11/2094 |
| | | | 707/610 |
| 2014/0280028 A1* | 9/2014 | Ding | G06F 16/2393 |
| | | | 707/717 |
| 2015/0356494 A1 | 12/2015 | Kolesnikov | |

(Continued)

OTHER PUBLICATIONS

Johnson, Theodore, et al., "Update Propagation in a Streaming Warehouse," In International Conference on Scientific and Statistical Database Management 2011, Lecture Notes in Computer Science, vol. 6809, Jul. 20, 2011, pp. 129-149, Springer, Berlin, Heidelberg.

(Continued)

*Primary Examiner* — Dinku W Gebresenbet
(74) *Attorney, Agent, or Firm* — S. Scott Foster; Kowert, Hood, Munyon, Rankin & Goetzel, P.C.

(57) ABSTRACT

Materialized views for a database system may be automatically refreshed according to performance benefits. Materialized views may be ordered according to determined performance benefits for the materialized views indicating the performance benefit obtained when a materialized view is used to perform a query at the database system. Materialized views may be selected for refresh operations according to the ordering based on a capacity of the database system to perform refresh operations.

20 Claims, 10 Drawing Sheets

(56) References Cited

U.S. PATENT DOCUMENTS

| | | |
|---|---|---|
| 2017/0092060 A1 | 3/2017 | Toohey et al. |
| 2018/0081905 A1 | 3/2018 | Kamath et al. |
| 2018/0139271 A1* | 5/2018 | Kumar .................... G06F 9/505 |
| 2019/0332698 A1 | 10/2019 | Cho et al. |
| 2020/0110748 A1 | 4/2020 | Watzke et al. |
| 2020/0311043 A1 | 10/2020 | Pham et al. |
| 2020/0334254 A1 | 10/2020 | Arye et al. |
| 2020/0379993 A1 | 12/2020 | Rajaperumal et al. |
| 2021/0165782 A1* | 6/2021 | Deshpande ......... G06F 16/2445 |

OTHER PUBLICATIONS

U.S. Appl. No. 16/699,486, filed Nov. 29, 2019, Rohan Deshpande, et al.

U.S. Appl. No. 16/699,512, filed Nov. 29, 2019, Rohan Deshpande et al.

U.S. Appl. No. 16/699,530, filed Nov. 29, 2019, Rohan Deshpande et al.

U.S. Appl. No. 16/699,547, filed Nov. 29, 2019, Rohan Deshpande et al.

* cited by examiner

AUTOMATICALLY REFRESHING MATERIALIZED VIEWS ACCORDING TO PERFORMANCE BENEFIT

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented.

Figure 1:
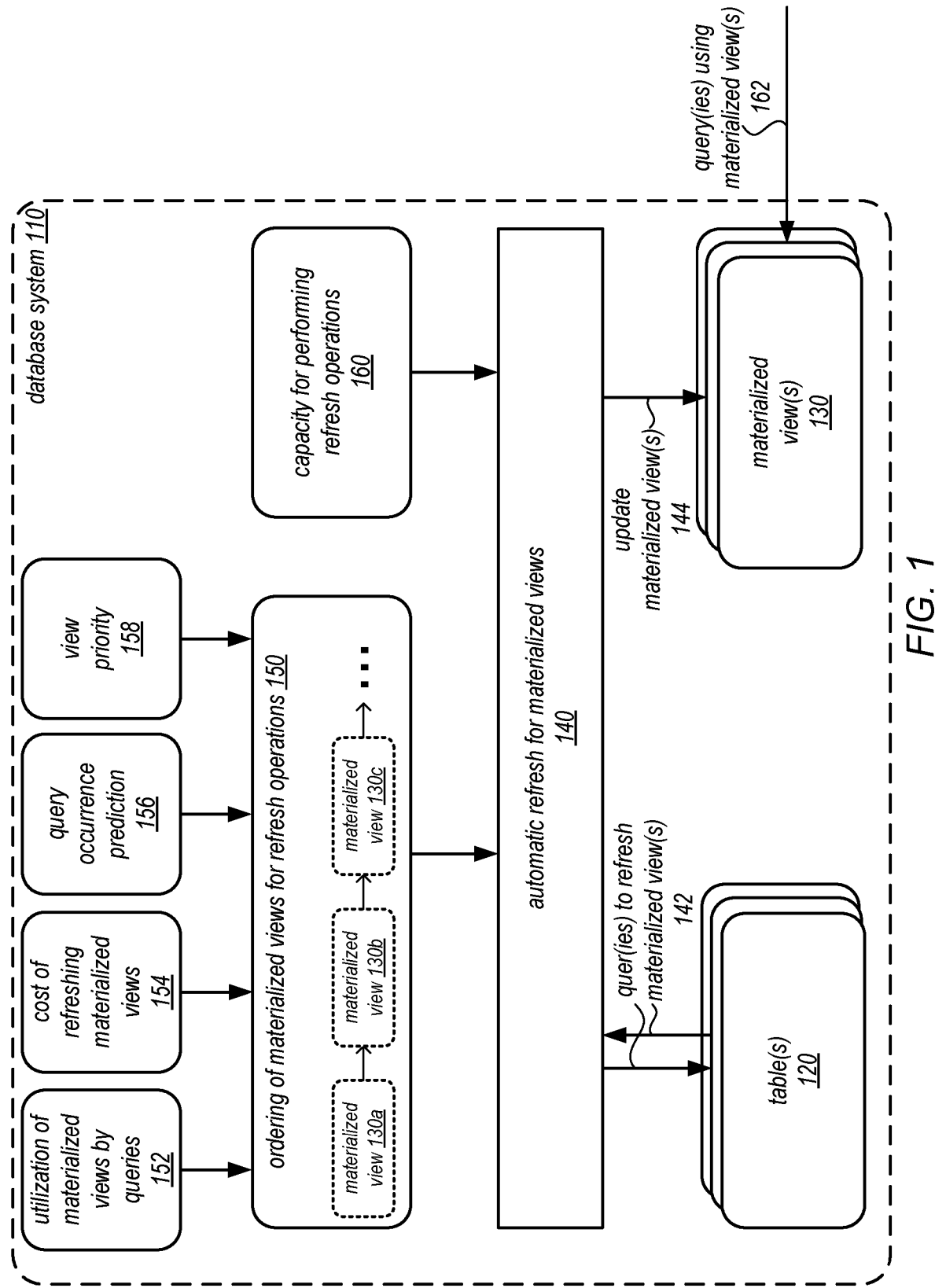
FIG. 1 is a logical block diagram illustrating automatically refreshing materialized views according to performance benefit, according to some embodiments

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for automatically refreshing materialized views according to performance benefit are described herein. Materialized views may be created for databases to offer a performance benefit to client applications because the results of a query stored as a materialized view may not have to be performed again in order to obtain information already found in the materialized view, in various embodiments. For example, instead of submitting the same query to database, the query may be submitted once to create the materialized view to obtain information. Then when the information is desired again, a query may be directed to the materialized view which already stores the information, saving computing resources to find, evaluate, combine, and/or otherwise process database data into a result for the query (or a query that is based on or could use the result of the query that is used to create the materialized view).

Materialized views, however, can become stale or out of sync with recent updates to a database. For example, updates to a database may add additional data, modify existing data, delete or remove data, alter data schemas for data, among other updates. In order to continue to offer useful information, a materialized view may be updated to be consistent with updates made to the database. Instead of utilizing manual refresh commands (e.g., instructed in scripts or by database administrators), techniques for automatically refreshing materialized views according to performance benefit may be implemented.

In various embodiments, automatically refreshing materialized views according to performance benefit may allow for queries to use materialized views for increased performance (e.g., either explicitly or view query rewriting techniques) and thus may maximize the probability that a materialized view is up-to-date at the time that it will be needed for accelerating a query. Queries that explicitly reference materialized views may get as fresh data as possible, and thus automatically refreshing materialized views may maximize the up-to-date differences between the present state of a materialized view (at the time it is queries) and the state that the materialized view would have if it were fresh. In various embodiments, automatically refreshing materialized views according to performance benefits may account for and may not cause (or, at least, minimize) disruption to other workloads.

FIG. 1 is a logical block diagram illustrating automatically refreshing materialized views according to performance benefit, according to some embodiments. Database system 110 may be various types of database system that allow clients to create materialized view(s) 130 from one or more source table(s) 120. As discussed above, in order to keep materialized view(s) 130 up to date to serve quer(ies) using materialized views 162 (either explicitly referenced by a query or a query that does not reference a materialized view being rewritten to use a materialized view), automatic refresh for materialized views 140 may be implemented, in various embodiments, utilizing various techniques discussed in detail below with regard to FIGS. 4-9.

For example, automatic refresh for materialized views 140 may utilize an ordering for materialized views for refresh operations 150. In this way, the individual materialized views 130a, 130b, 130c, and so on, may be determined to refresh materialized views in an order that provides the most benefit to client applications that utilize materialized views 130. Different factors may be used to determine the ordering of materialized views 150 according to performance benefit. For example, utilization materialized views by queries may be determined, as indicated at 152, as well as cost of refreshing the materialized views 154, query occurrence predictions 156, and/or view priority information 158 (e.g., which may allow for users designate high priority views for refresh in the ordering). Automatic refresh for materialized views 140 may then schedule and perform refresh operations based on the capacity for performing refresh operations 160, which may be predicted as spare capacity or determined from allocated capacity (e.g., a budget) for performing refresh operations. In some embodiments, automatic refresh for materialized views 140 may utilize additional resources, such as a separately provisioned processing cluster as discussed below with regard to FIGS. 3 and 5.

Please note that the previous description of a database, table, materialized view, automatic refresh, and various interactions are logical descriptions and thus is not to be construed as limiting as to the implementation of these features.

This specification begins with a general description of a provider network that implements database services (or other data storage or processing services) that may implement using computer resources to perform database queries and implement materialized views, including automatically refreshing materialized views according to performance benefit. Then various examples of one such database service, including different components/modules, or arrangements of components/module that may be employed as part of implementing the techniques are discussed. A number of different methods and techniques to implement automatically refreshing materialized views according to performance benefit, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
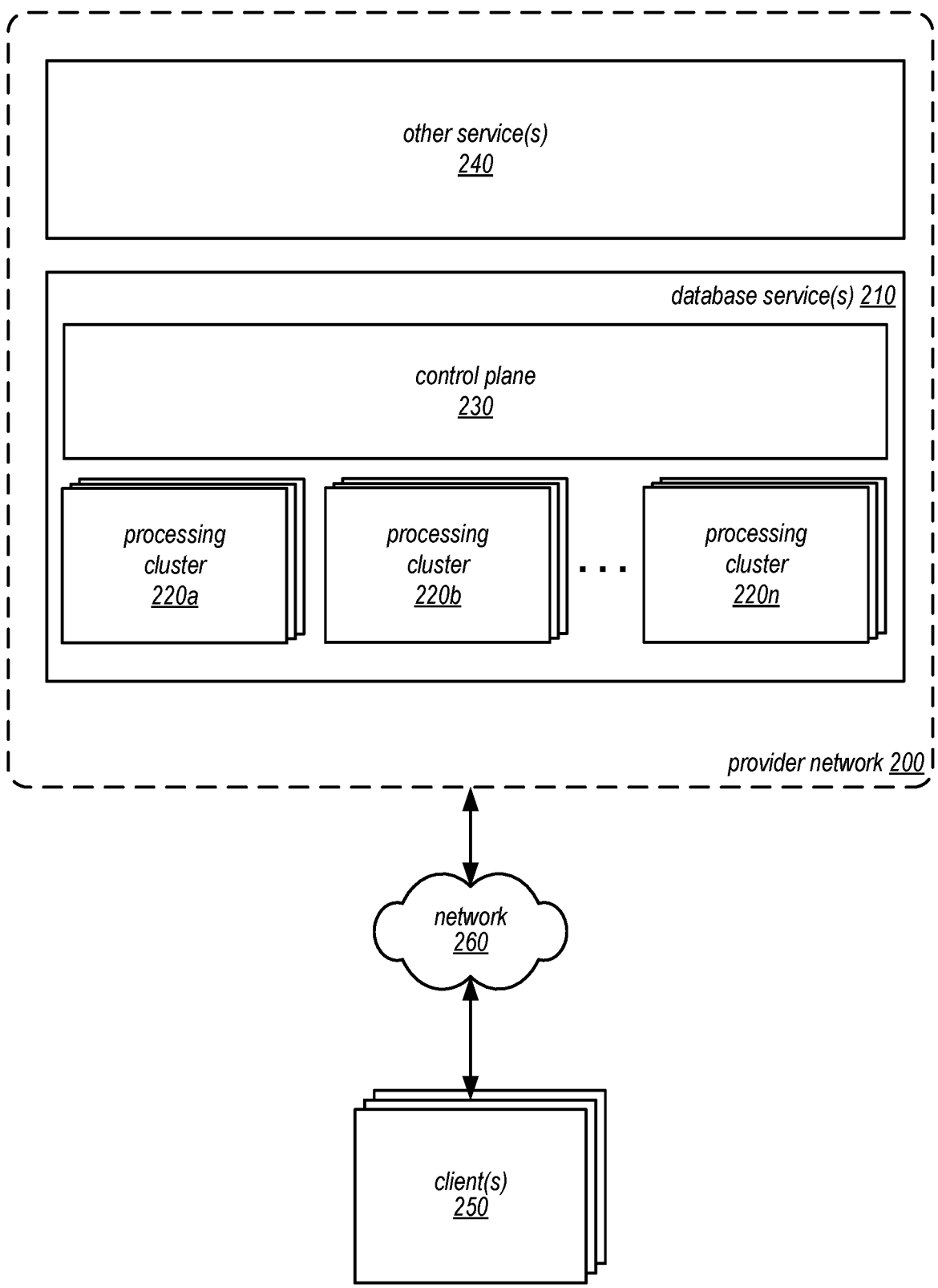
FIG. 2 is a logical block diagram illustrating a provider network offering a database service that provides materialized views for databases hosted in the database service, according to some embodiments.

FIG. 2 is a logical block diagram illustrating a provider network offering a database service that provides materialized views for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment.

In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
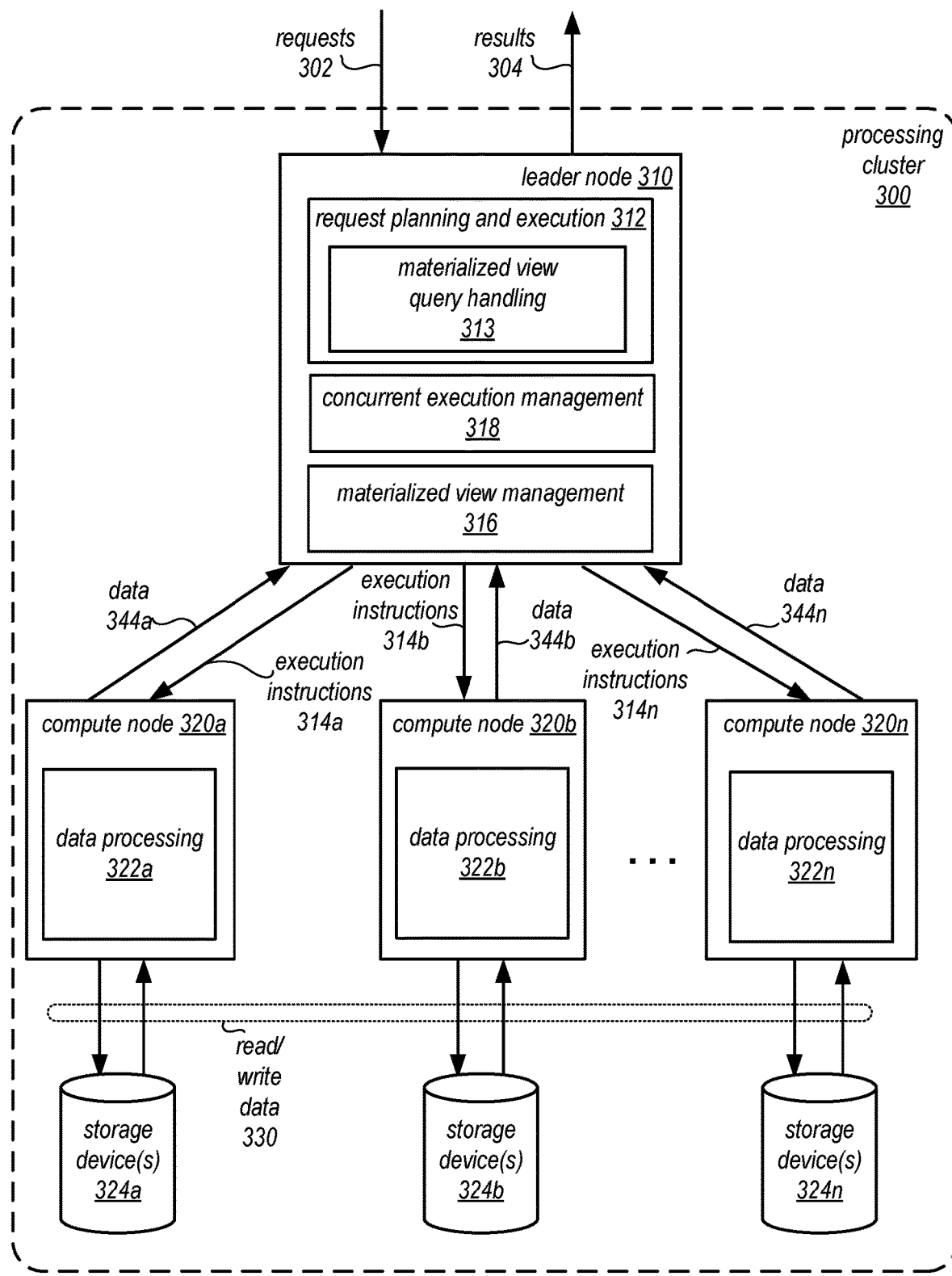
FIG. 3 is a logical block diagram illustrating a processing cluster of a database service that implements materialized view management to automatically refresh materialized views according to performance benefit, according to some embodiments.

FIG. 3 is a logical block diagram illustrating a processing cluster of a database service that implements materialized view management to automatically refresh materialized views according to performance benefit, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment. For example, request planning and execution 312 may implement materialized view query handling 313. A created materialized view may be provided by creating internal table(s) that cannot be directly referenced or accessed by a query (and a compensation view in some scenarios), in some embodiments. However, in other embodiments, when a request to create a materialized view is received, a table or other data structure that stores the materialized view that can be directly referenced and accessed by a query may be created. Instead, materialized view query handling 313 may perform techniques to rewrite or modify the performance of a query to access the materialized view.

Leader node 310 may implement materialized view management 316, discussed in detail below with regard to FIG. 4, to create and update materialized views. Leader node 310 may also implement concurrent execution management 318, which may utilize additional processing clusters to offload work, such as queries or refresh operations, as discussed in detail below with regard to FIG. 5. Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for request 302, in one embodiment. Request 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
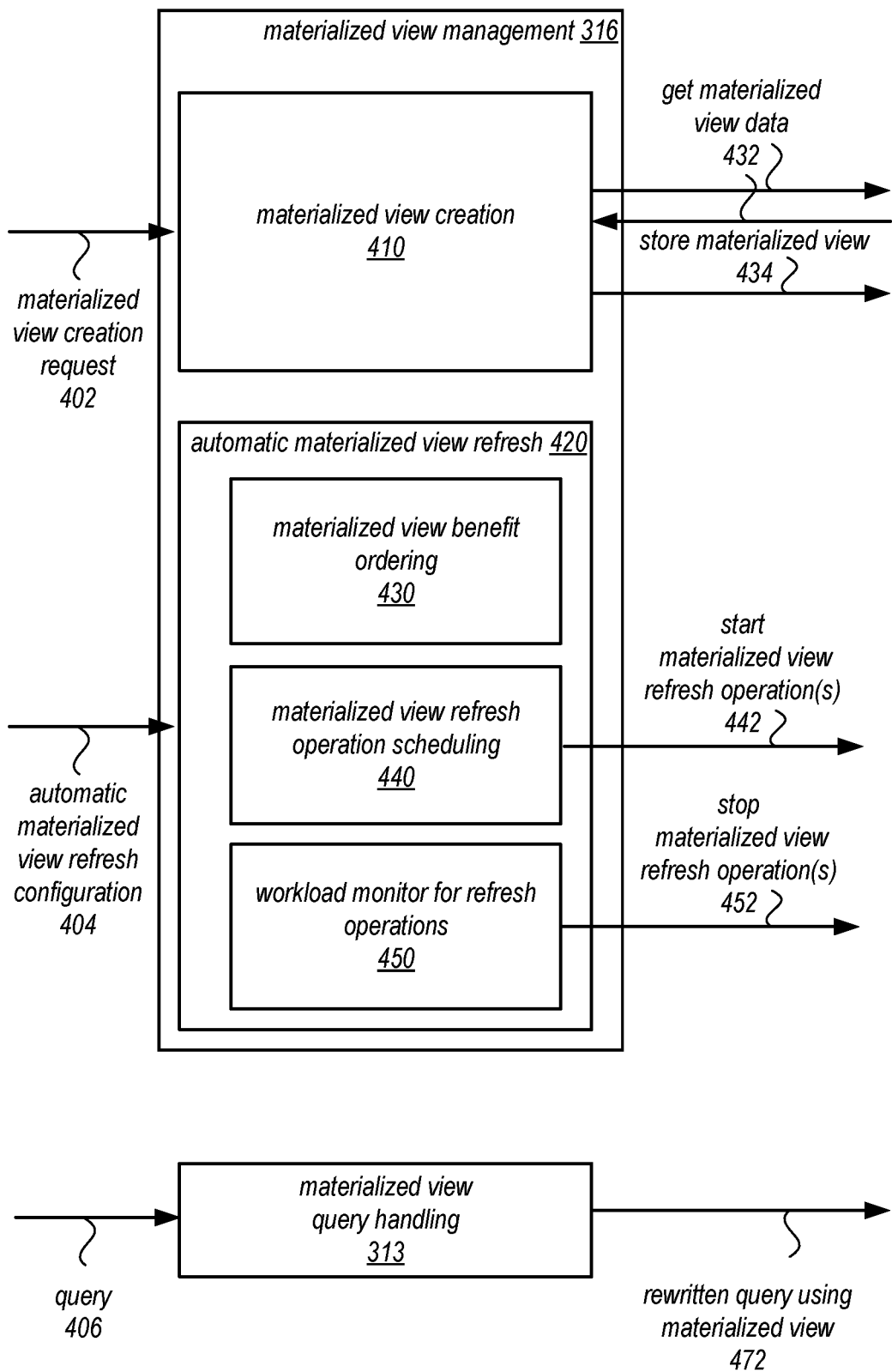
FIG. 4 is a block diagram illustrating materialized view management that implements automatically refreshing materialized views according to performance benefit, according to some embodiments.

FIG. 4 is a block diagram illustrating materialized view management that implements materialized view creation and update, according to some embodiments. Materialized view management 316 may perform various operations to create and update materialized views created from a database. Although illustrated as part of processing cluster 300 in FIG. 3, some or all features of materialized view management 316 may be implemented using separate resources (e.g., as a separate microservice within database service(s) 210.

Materialized view management 316 may implement materialized view creation 410. Materialized view creation 410 may handle requests related to the creation and management of materialized views from a client (e.g., client(s) 250 in FIG. 2). A client may submit requests via an interface (e.g., to a network endpoint for a processing cluster using a connection, such as JDBC or ODBC as discussed above or a programmatic interface such as an API, a command line interface and/or graphical user interface, such as a console for database service(s) 210) to create a materialized view, such as request 402.

Materialized view management 316 may handle (or dispatch to other components, such as compute node(s) 320), various operations to generate the materialized view as part of materialized view creation 410. For example, materialized view creation 410 may parse or analyze a view definition received as part of materialized view creation request 402 (e.g., stated as a query in SQL) and direct the performance of various operations to get, as indicated at 432, materialized view data from source tables specified in the materialized view definition (e.g., by generating and sending instructions according to plan or procedure generated to create the materialized view). The materialized view data may then be stored, as indicated at 434 for subsequent access (e.g., at storage devices attached to or accessible to compute node(s) 320). For example, a materialized view may be stored as a table.

Automatic materialized view refresh 420 may implement various techniques to refresh materialized views, as discussed in detail below with regard to FIGS. 6-9. For example, materialized view benefit ordering 430 may order materialized views for refresh according to determined performance benefits which may include features indicative of utilization, cost to refresh, likelihood of query occurrence, among others. Materialized view benefit ordering 430 may order the materialized views for scheduling, at 440. For example, materialized view refresh operation 440 may implement a best effort scheduling technique which may determine a spare capacity (e.g., spare after client workload), to select a number of refresh operations for materialized views up to the amount that can be performed within spare capacity. Materialized view refresh operation scheduling 440 may start materialized view refresh operation(s) 442, in some embodiments. As discussed below with regard to FIG. 9, workload monitor for refresh operations 450 may stop materialized view refresh operation(s), as indicated at 452, when client workload events are detected, in some embodiments.

Materialized view query handling 313 may rewrite a received query 406 (which may or may not target a materialized view) to use a materialized view, as indicated at 472, in some embodiments.

In some embodiments, automatic materialized view refresh management 420 may support the configuration of automatic materialized view refresh operations for a database. For example, a client may submit a request 404 that provides various parameters, settings, controls, policies or other configuration information for automatic materialized view refresh operations. In some embodiments, automatic materialized view refresh configuration information may specify a priority for a materialized view in the materialized view ordering determined by materialized view benefit ordering 430. For instance, a specific materialized view may be selected for a priority classification (e.g., "high") which may modify a determined ordering to move up a materialized view for scheduling. In some embodiments, a configuration request may be submitted as a request directed to a materialized view, such as an "ALTER" command that targets a materialized view to change the priority value or set a priority value.

Automatic materialized view refresh configuration requests 402 may, in some embodiments, authorize or specify a capacity either at a processing cluster that implements materialized view management 326 (e.g., processing cluster 300) or at another processing cluster used for concurrency scaling, which may be used for refresh operations. For example, various resource units or other measurements of work performed or capacity to perform work (e.g., a size or capacity of a processing cluster to provide X memory, Y processing capacity, and/or Z storage for X time or up to spending X utilization credits (e.g., determined based on the work performed)) may be used to describe or limit the performance of refresh operations up to or using up the specified capacity.

Figure 5:
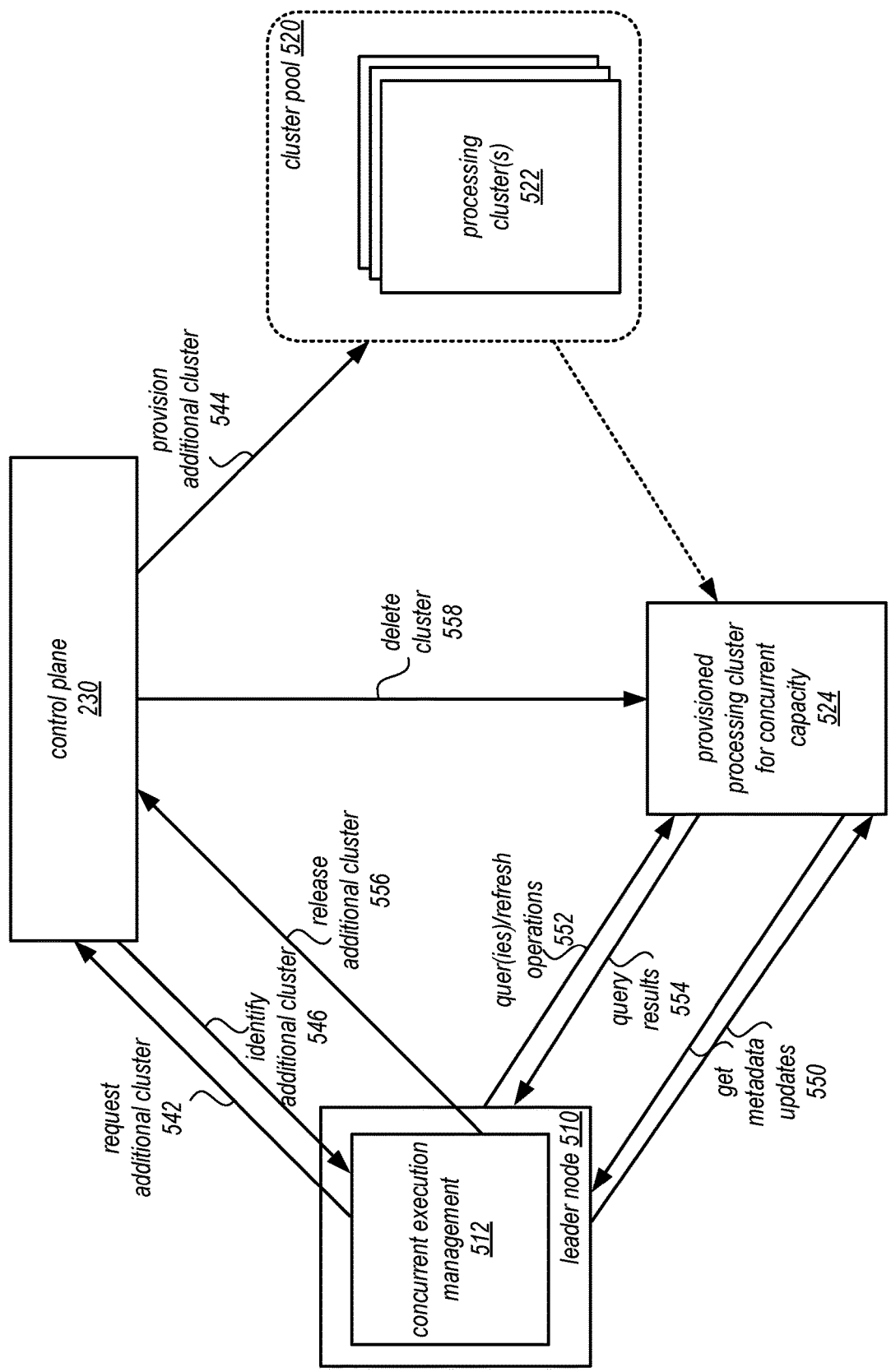
FIG. 5 is a block diagram illustrating interactions to increase refresh operation capacity using concurrency scaling for performing queries, according to some embodiments.

In various embodiments, materialized view management 316 may interact with or take advantage of additional capacity offered by a concurrency scaling to use an additional one or more processing clusters. FIG. 5 is a block diagram illustrating interactions to increase refresh operation capacity using concurrency scaling for performing queries, according to some embodiments. Concurrent execution management 512 at leader node 510 (e.g., similar to leader node 310 and concurrent execution management 318 in FIG. 3) may detect or determine when to obtain an additional cluster for performing queries in various scenarios, such as scenarios to increase capacity to perform refresh operations for materialized views. For example, the additional cluster may be obtained to execute refresh operations (e.g., up to a requested capacity in automatic materialized view refresh configuration information 404) or to perform queries to allow the current cluster to perform refresh operations. Concurrent execution management 512 may then request an additional cluster 542 from control plane 230. The request may, in some embodiments, specify a type of cluster (e.g., with various resource specifications or capacities for network, storage, processor, memory, etc.). In some embodiments, control plane 230 may evaluate a manifest, index, or other data that describes available processing cluster(s) 522 in cluster pool 520 in order to satisfy the request. For example, control plane 230 may identify a processing cluster that matches (or best matches) the specified configuration of the additional cluster request, in some embodiments. In some embodiments, control plane 230 may identify a cluster that was previously used for performing queries to the database hosted by the cluster of leader node 510.

Control plane 230 may provision 544 the additional cluster, in some embodiments, from cluster pool 520, such as provisioned processing cluster for concurrent capacity 524. Provisioning an additional cluster may include various operations to configure network connections between provisioned processing cluster for concurrent capacity 524 and leader node 510 and other services (e.g., format independent data processing service, object storage service 502, etc.). In some embodiments, access credentials, security tokens, and/or encryption keys may be provided so that provisioned processing cluster for concurrent capacity 524 can access and database data to perform queries for the database. In some embodiments, initialization procedures, workflows or other operations may be started by control plane 230 at provisioned processing cluster for burst capacity 524. For example, provisioned processing cluster for burst capacity 524 may get metadata from another storage service, such as an object-based storage service that stores database metadata in a database backup in order to perform queries to the database. In some embodiments, provisioned processing cluster for burst capacity 524 may get metadata updates 550 directly from leader node 510 (or other nodes in a primary processing cluster) in order to catch up the metadata to account for changes that occurred after the backup was stored. Control plane 230 may track the time to complete provisioning or otherwise initialize provisioned processing cluster 524 as well as for other provisioned processing cluster for concurrent capacity's. The initialization times may be averaged and included in an evaluation of predicted execution times, as discussed below with regard to FIG. 9.

Once provisioning is complete, provisioned processing cluster for burst capacity 524 may be made available for performing queries or refresh operations. Control plane 230 may identify the burst cluster 546 to leader node 510 (e.g., by providing a network endpoint for provisioned cluster 524), in some embodiments. Leader node 510 may then begin directing selected queries or refresh operations 552 to provisioned cluster 524, which may perform the queries or refresh operations and, in the case of queries, send back query results 554 to leader node 510, which may provide the results to a client in turn. In this way, a client application does not have to learn of and receive requests from a second location, provisioned cluster 524 when concurrent performance is used, in some embodiments.

When an event that triggers release of the provisioned cluster for concurrent capacity occurs, concurrent execution management 512 may send a request to control plane 230 to release the provisioned cluster 556 (e.g., by including the identifier of the provisioned cluster 524). Control plane 230 may then delete the provisioned cluster 558 (e.g., by removing/deleting data and/or decommissioning/shutting down the host resources for the provisioned cluster 524).

Figure 6:
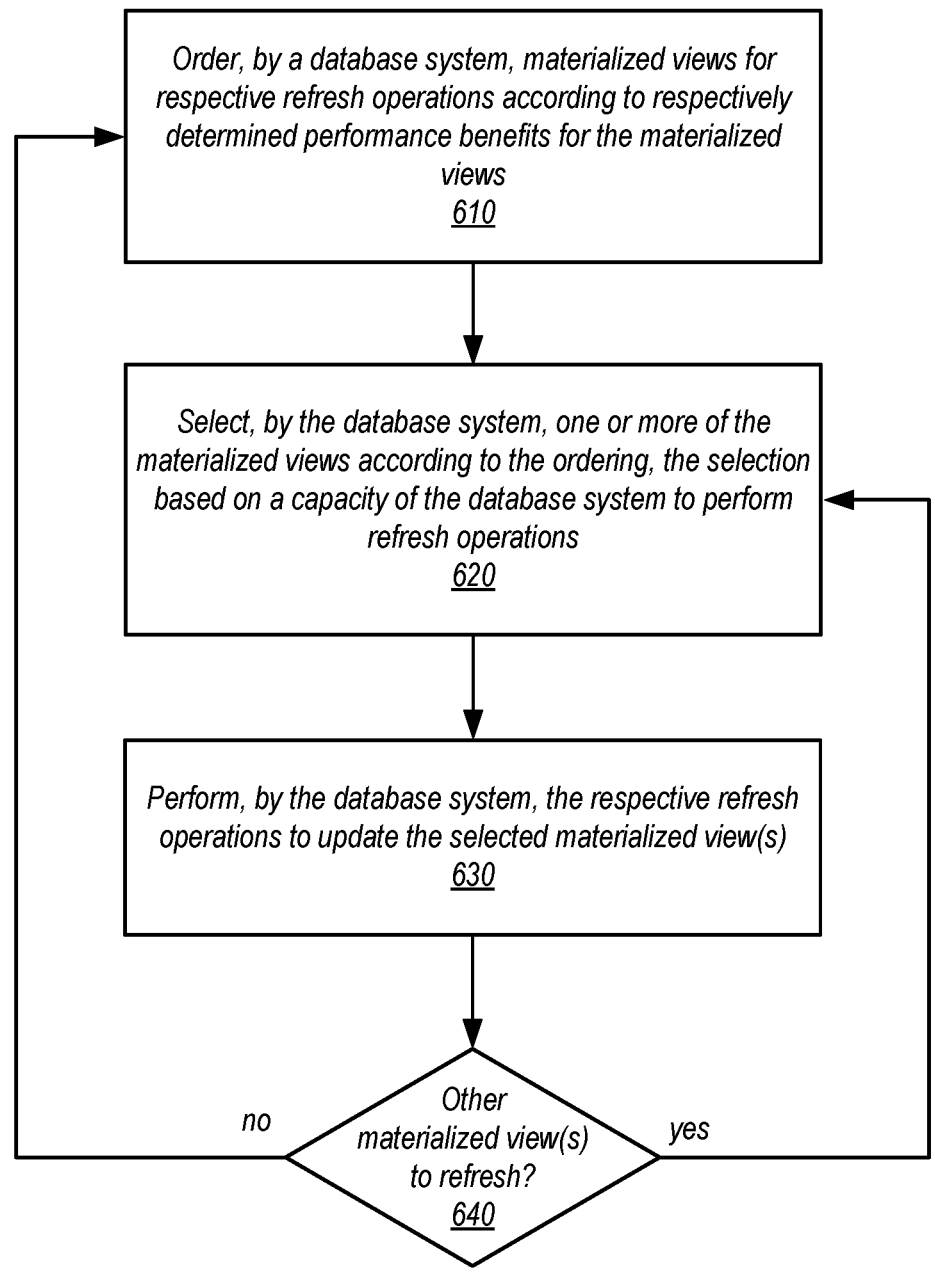
FIG. 6 is a high-level flowchart illustrating methods and techniques to implement automatically refreshing materialized views according to performance benefit, according to some embodiments.

Although FIGS. 2-5 have been described and illustrated in the context of a database service, like a data warehouse service implementing a columnar relational database table, the various components illustrated and described in FIGS. 2-5 may be easily applied to other database or data storage systems that provide materialized views of database data. As such, FIGS. 2-5 are not intended to be limiting as to other embodiments of a storage engine, query engine, a single or distributed database engine or management system, processing cluster, or other component that may implement using computer resources to perform the creation of materialized views and automatic refresh operations for materialized views, including resources, hosts, systems, or devices that are separate from the query engine or database management system itself (e.g., an external data replication store or system). FIG. 6 is a high-level flowchart illustrating methods and techniques to implement automatically refreshing materialized views according to performance benefit, according to some embodiments. Various different systems and devices may implement the various methods and techniques described below, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, materialized views may be ordered by a database system for respective refresh operations according to respectively determined performance benefits for the materialized views. In various embodiments, the performance benefits may be predicted, estimated, or otherwise determined to be obtained for each materialized view so that the performance benefit indicates the performance benefit for performing a query using the materialized view. As discussed in detail below with regard to FIG. 7, various features of a performance benefit may include, the difference in performance between a query with and without a materialized view, the distribution of performance benefit among multiple materialized views that can be used for a query, the cost of performing a refresh operation (which may reduce the performance benefit of a materialized view, among others. In some embodiments, priority information for materialized views may be provided (e.g., via a request to a database system) that modifies the ordering (e.g., to move up a materialized view to be refreshed sooner with a "high" priority).

As indicated at 620, one or more of the materialized views may be selected by the database system, according to the ordering (determined at 610), in various embodiments. The selection may be based on a capacity of the database system to perform refresh operations. For example, as discussed in detail below with regard to FIG. 8, the capacity may be spare capacity to perform refresh operations, the spare capacity not interfering with client requests or workload. In some embodiments, the capacity may be a specified budget or allocation of database system resources that can be set aside for performing refresh operations (e.g., by a system configuration or according to a configuration request for automatic materialized view refresh). In some embodiments, refresh operation capacity may be increased utilizing concurrency scaling techniques like those discussed above with regard to FIG. 5. In some embodiments, a threshold determination may first be made as to whether a selected materialized view is in need of a refresh. If, for example, none of the source tables for the materialized views have been updated since creation or a last refresh, then the materialized view may be skipped or otherwise not selected. In some embodiments, automatic refresh configuration information (e.g., specified via a request) may modify or adjust the ordering of materialized views, such as by identifying a highest priority or group of high priority materialized views to be refreshed first).

As indicated at 630, the respective refresh operations for the selected materialized view(s) may be performed by the database system, in some embodiments. For example, background worker threads may be started or initiated to begin performing the various queries or other operations to obtain from source tables changed data and generate the updates necessary to refresh a materialized view. In some embodiments, the query or other specification of the materialized view in a view definition may be re-executed. In some embodiments, these refresh operations may be performed in parallel. As discussed in detail below with regard to FIG. 9, there may be scenarios where changes in workload at database system (e.g., caused by client requests) may pause, halt, kill, or otherwise stop a refresh operation). Refresh operations may continue to be performed using the ordering if other materialized views remained to be refreshed, as indicated by the positive exit from 640. In this way, materialized views further in the order (or materialized views with stopped refresh operations) will be refreshed before another materialized view is refreshed again.

As indicated by the negative exit from 640, automatic materialized view refresh may continue, including re-determining the order of materialized views. In this way, new materialized views created since the last ordering may be included in the ordering for refresh.

Figure 7:
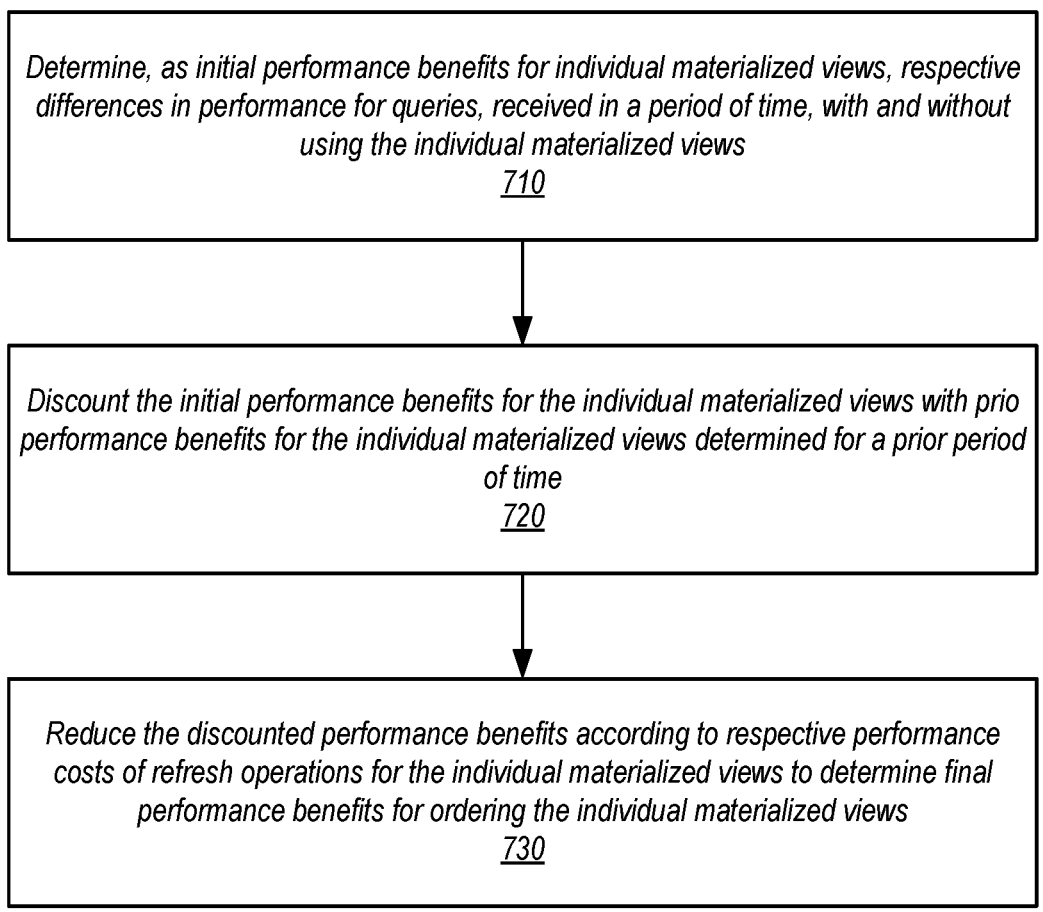
FIG. 7 is a high-level flowchart illustrating methods and techniques to determine a performance benefit for a materialized view, according to some embodiments.

As noted earlier, many different factors may influence the performance benefit used to order materialized views for refresh. Comparison of performance times, predicted occurrence of queries, and/or various other factors may be included in performance benefit calculations. FIG. 7 is a high-level flowchart illustrating methods and techniques to determine a performance benefit for a materialized view, according to some embodiments. As indicated at 710, initial performance benefits may be determined for individual materialized views, in some embodiments. These initial performance benefits may be determined according to the differences in performance for a query, received in a period of time (e.g., a time window), with and without using the individual materialized views, in some embodiments. For example, for each query in the time period, a materialized view which was or could have been used to improve latency of the query may be identified. For each materialized view found, the latency (e.g., execution time) improvement by rewriting the query to use the materialized view (or vice versa for queries which used the materialized view, are rewritten to use base tables by unfolding the materialized view) may be estimated. Taking the difference of the two queries (with and without using a materialized view), and the estimated background or other workload, a performance benefit accrued to query by the use of the materialized view. This benefit may be ascribed to the materialized view and added (along with other queries in the query time window) to determine an initial performance benefit for that materialized view. The same techniques may be repeated for other materialized views that can be utilized by other queries in the time period. Query performance with and without a materialized view may be estimated using various techniques, such as cost value determined by a query plan cost optimizer, various heuristics, statistics, and/or machine learning model(s) trained to estimate query performance (e.g., execution time) given a query (e.g., one as is and one rewritten to include or use a materialized view).

As indicated at 720, the initial performance benefits for the individual materialized views may be discounted using performance benefits determined for the individual materialized views for a prior period of time. In this way, a performance benefit may reflect the declining utility of a materialized view if queries using those materialized views decline over time. In various embodiments, this may be used to tune for multiple use cases like dashboards which sends multiple relatively fast queries every day vs reporting which sends complex, time consuming queries once a week. This tuning parameter can be learnt for each database separately (e.g., for each processing cluster in FIG. 3).

As indicated at 730, respective performance costs of refresh operations for the individual materialized views may be used to reduce the discounted performance benefits to determine final performance benefits for ordering the individual materialized views, in some embodiments. For example, the costs of refresh operations may be determined by averaging, measuring or otherwise tracking materialized view refresh operation costs on a per materialized view basis or as a group, in some embodiments. The estimated performance costs may then be subtracted from the discounted performance benefits or used to divide the respective performance benefits.

As noted above with regard to FIG. 1, in some scenarios, predictions of the likelihood of a query occurring in a future time period may be used to adjust the performance benefit for ordering materialized view refresh operations. For example, a database system may have a mixed workload such that reporting queries come at the end of the week while dashboard queries keep running every day. To handle the case when reporting queries are expected and materialized views used by reporting queries should be up to date, predictions of query occurrence may be implemented. Query prediction may be determined in various ways (e.g., using various statistical analyses and/or machine learning models that forecast or otherwise predict when or if a query may occur in the future). This prediction may be added to the benefit calculation above with a weight, in some embodiments. In this way, future benefits of a materialized view may also be considered (e.g., in scenarios when the past is not indicative enough).

Below is a non-limiting pseudo code description of an example algorithm implementing for materialized views (MVs) various features of the techniques described above:

```
Input :
    benefit[mv] : current benefit estimate for each mv
    time_in_refresh[mv] : exponentially weighted
                             average of time spent
                             refreshing each MV so far
                             initialized to 0 for all MVs.
    query_window : queries executed since last sort
                     that were slow (> 2 seconds)
                     or used MVs
Output :
    sorted list of MVs
    for query in query_window:
        temp_benefit = [0]*NUM_MVs
        for mv in ALL_MVs:
            # query is an s-exp stored after execution
            Rewritten_query = MV_rewrite(query, mv)
            if (query != Rewritten_query):
                # The benefit is the difference between
                # estimated_time of original
                # query and rewritten query
                temp_benefit[mv] +=
                    estimated_time(query)
                     - estimated_time(Rewritten_query)
        total_benefit = SUM over all_MVs of
                         temp_benefit[mv]
        for mv in ALL_MVs:
            relative_temp_benefit[mv] =
                     temp_benefit [mv] / total benefit
            # .99 can be tuned, this has a half life
            # of ~6 hours
            benefit[mv] = .99*benefit[mv] +
                            .01*relative_temp_benefit[mv]
    # C = k * sum(benefit) / sum(time_in_refresh) as it
    # requires minimal tracking,
    # alternatives will be investigated in V2. Here, k
    # will be tuned to weigh benefit
    # (typically higher) against cost.
    return MVs sorted by (benefit − C*time_in_refresh) in
        decreasing order
```

As discussed above, in some embodiments, coverage for a query may be provided from multiple materialized views. In various embodiments, to account for coverage properties, and the exact benefits each query to as a result of a query rewrite using different materialized views, some techniques may be implemented that consider subsets of materialized views. For example, since there may be an exponential number of subsets of materialized views (2^{number of materialized views}) this rapidly becomes a large and costly calculation. However, for any query only a small number of materialized views may be applicable. In various embodiments, Shapley values may be used, where the Shapley value satisfies the properties Efficiency, Symmetry, Dummy and Additivity. Efficiency may be described as that total benefit from a query, divided up among all materialized views=runtime (query without any materialized view)−runtime(query without any materialized views). Additivity may allow incremental accounting over smaller windows of queries. Dummy may be described as adding materialized views that do not impact any queries and does not impact the benefit assigned to useful materialized views. Symmetry may be described as if a new copy of a materialized view is added, the benefits may be equal.

Below is a non-limiting pseudo code description to extend the above example algorithm to handle coverage properties based on Shapley values:

```
N = total_number of MVs
for query in query_window:
    applicable_mvs = set of all mvs applicable to
    specific query
        for mv in MVs applicable_mvs:
            for S in all subsets of {applicable_mvs-
                    mv} :
                benefit[mv] = benefit[mv] +
                    (1/N!) * |S|!(N − |S1 −1)! *
                    [runtime(S) − runtime(S+mv)]
```

In one case where runtime(query)=1 and runtime of(query with materialized view)=0 for all queries, this reduces to a scaled version of the earlier algorithm described above. The complexity in this algorithm arises from 1) for S in all subsets of {applicable_materialized_views—materialized view} and 2) what-if runtime estimates of runtime(S)—runtime(S+materialized view). If the incrementally requirement is given up, the coverage ILP can be constructed with all relevant what if estimates and solve this. In some embodiments, this large ILP may be solved once a day, and used to guide the benefit allocated over time, so that benefit at any time will be e.g. 0.5*ILP_benefit[mv]+0.5*benefit [mv].

Figure 8:
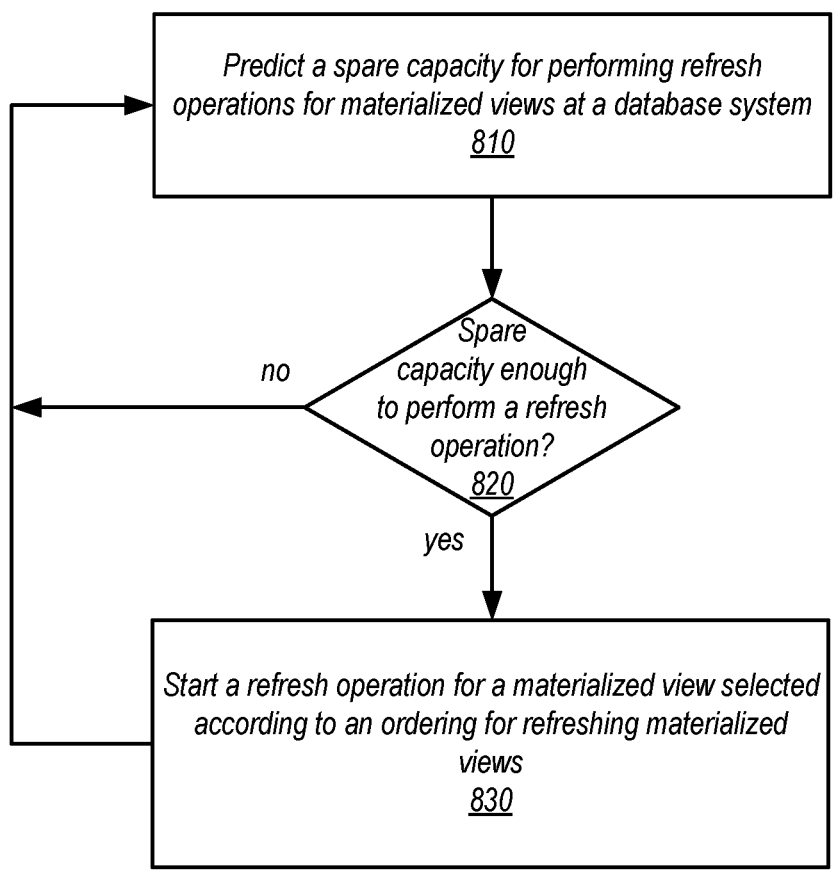
FIG. 8 is a high-level flowchart illustrating methods and techniques to implement predicting spare capacity for selecting refresh operations for materialized views, according to some embodiments.

FIG. 8 is a high-level flowchart illustrating methods and techniques to implement predicting spare capacity for selecting refresh operations for materialized views, according to some embodiments. As indicated at 810, spare capacity for performing refresh operations for materialized views at a database system may be predicted, in some embodiments. For example, various machine learning models, resource usage trackers (e.g., for network, processor, memory, I/O, or other computing resources), number of segments running or various other information may be used to determine the spare capacity for a database system.

In at least some embodiments, a best effort scheduling technique may be implemented. For example, as indicated at 820 if enough spare capacity exists to perform a refresh operation, then, as indicated at 830, a refresh operation for a materialized view selected according to an ordering for refreshing materialized views may be started, in various embodiments. Such scheduling may continue until no more spare capacity exists to perform a refresh operation. Then, as indicated by the negative exit from 820, other refresh operations may wait until predicted spare capacity is again enough to perform a refresh operation (e.g., when a refresh operation finishes, when additional capacity is added because of concurrency, etc.).

Figure 9:
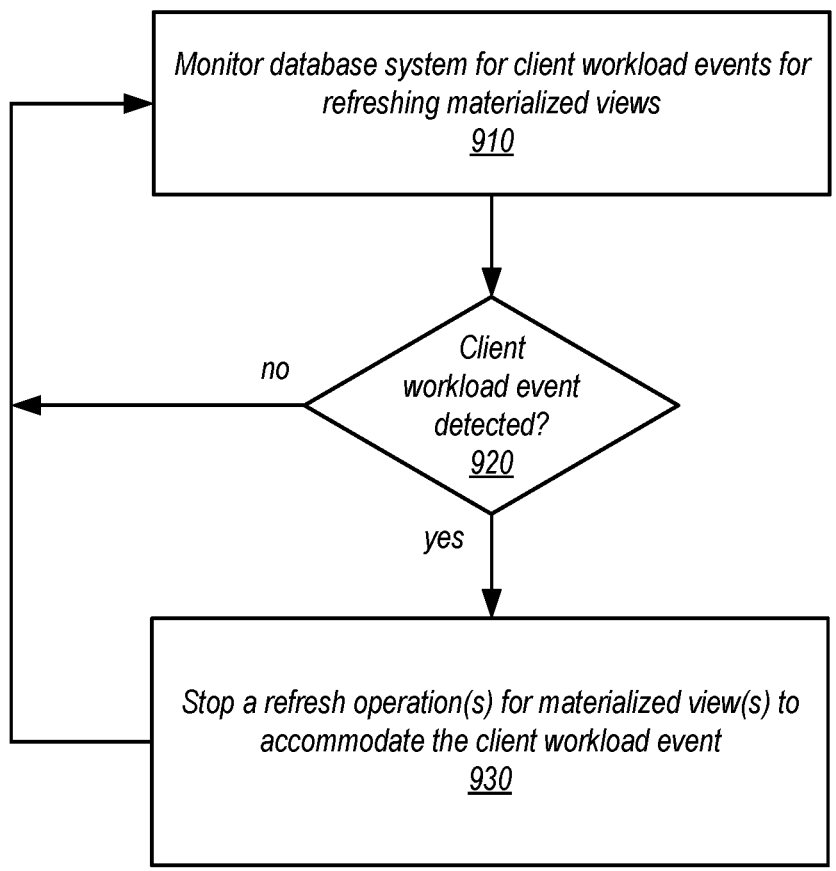
FIG. 9 is a high-level flowchart illustrating methods and techniques to implement monitoring for client workload events for refreshing materialized views, according to some embodiments.

Some changes in workload at a database system may impact the performance of refresh operations. To prevent refresh operations from interfering with other workloads, like client workloads, various monitoring techniques or other techniques to mitigate the burden of refresh operations may be performed. FIG. 9 is a high-level flowchart illustrating methods and techniques to implement monitoring for client workload events for refreshing materialized views, according to some embodiments.

As indicated at 910, a database system may be monitored for client workload events for refreshing materialized views, in some embodiments. For example, different types of client workload events may be implement. One type of client workload event may be related to specific types of client request. For example, a client request to manipulate a database using a Data Definition Language (DDL) request on a materialized view, source table, or other portion of the database may trigger a client workload event. In some embodiments, the workload of client requests (e.g., queries) may exceed a threshold workload amount (e.g., at above a resource utilization threshold for processor, memory, network, I/O, and/or storage).

For detected workload events, as indicated by the positive exit from 920, a one or more refresh operation(s) for materialized view(s) may be stopped to accommodate the client workload event, in some embodiments. For example, worker threads for refresh operations may be suspended, or progress recorded and resources released in order to free up capacity of resources at the database system to perform client workload. In some embodiments, after a time out period, refresh operations for the materialized views may be resumed (or restarted from the beginning) if a client workload event is no longer detected.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of using computer resources to implement automatically refreshing materialized views according to performance benefit as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for automatically refreshing materialized views according to performance benefits are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
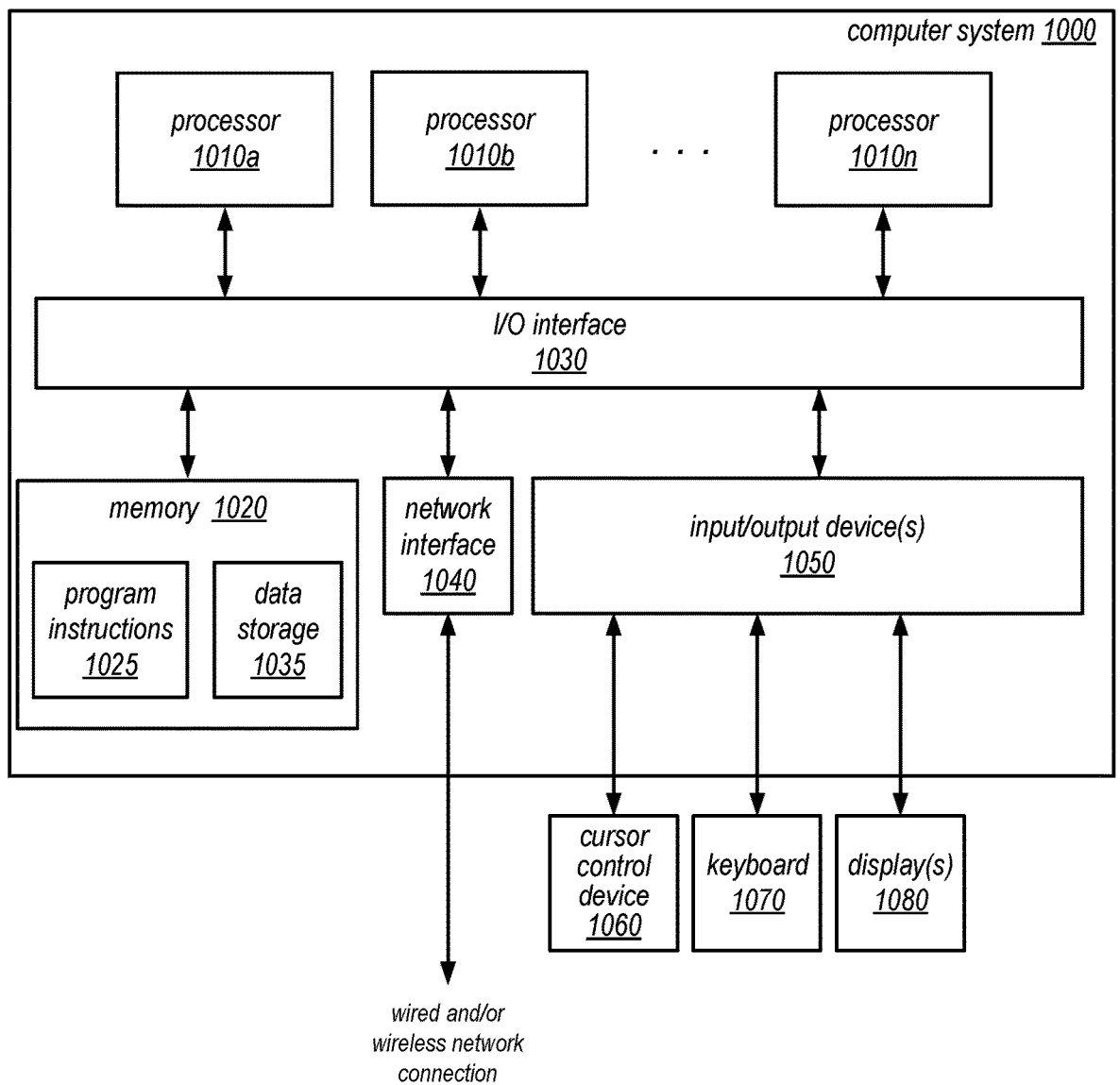
FIG. 10 illustrates an example system to implement the various methods, techniques, and systems described herein, according to some embodiments.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database system, configured to:
   determine respective performance benefits for a plurality of materialized views already hosted by a database system, the respective performance benefits being obtained when using the materialized views for queries received at the database system;
   order the plurality of materialized views according to the respective performance benefits;
   determine a capacity of the database system to perform refresh operations;
   select, according to the ordering, one or more of the plurality of materialized views already hosted by the database system to perform the respective refresh operations until no more of the determined capacity exists to perform an additional refresh operation for a different one of the plurality of materialized views; and
   perform the respective refresh operations to update the selected one or more materialized views.

2. The system of claim 1, wherein to determine the respective performance benefits for the plurality of materialized views, the database system is configured to:
   determine, as respective initial performance benefits for the plurality of materialized views, respective differences in performance of a plurality of queries, received in a period of time, with and without using at least one of the plurality of materialized views;
   discount the respective initial performance benefits for the plurality of materialized views with respective prior performance benefits determined for the plurality of materialized views for a prior period of time; and
   reduce the respective discounted performance benefits according to respective performance costs of refresh operations for the plurality of materialized views to determine the respective performance benefits for the plurality of materialized views.

3. The system of claim 2, wherein to determine the respective initial performance benefits for the plurality of materialized views, the database system is configured to divide the respective initial performance benefit for two or more of the plurality of materialized views that are usable to perform a same query amongst the two or more materialized views.

4. The system of claim 1, wherein the database system is a data warehouse service implemented as part of a provider network and wherein the performance of the selected one or more materialized views that are selected according to the ordering is performed after receiving a request via an interface for the data warehouse service that enables automatic refresh for materialized views.

5. A method, comprising:
ordering, by a database system, a plurality of materialized views already stored by the database system for respective refresh operations according to respectively determined performance benefits for the materialized views, the respective performance benefits being obtained when using the materialized views for queries received at the database system;
selecting, by the database system according to the ordering, one or more of the plurality of materialized views already stored by the database system to perform the respective refresh operations, the selecting being performed until no more of a capacity of the database system exists to perform an additional refresh operation for a different one of the plurality of materialized views; and
performing, by the database system, the respective refresh operations to update the selected one or more materialized views.

6. The method of claim 5, further comprising:
determining, by the database system as respective initial performance benefits for the plurality of materialized views, respective differences in performance of a plurality of queries, received in a period of time, with and without using at least one of the plurality of materialized views;
discounting, by the database system, the respective initial performance benefits for the plurality of materialized views with respective prior performance benefits determined for the plurality of materialized views for a prior period of time; and
reducing, by the database system, the respective discounted performance benefits according to respective performance costs of refresh operations for the plurality of materialized views to determine the respective performance benefits for the plurality of materialized views.

7. The method of claim 5, further comprising predicting, by the database system, spare capacity of the database system as the capacity of the database system to perform refresh operations.

8. The method of claim 5, wherein the ordering of the plurality of materialized views is modified according to a configuration for automatically refreshing materialized views received via an interface for the database system.

9. The method of claim 5, further comprising:
monitoring, by the database system, for a client workload event; and
responsive to detecting a client workload event, stopping, by the database system, a refresh operation started for one of the plurality of materialized views to accommodate the client workload event.

10. The method of claim 9, wherein the client workload event is detected when a workload for performing one or more client requests exceeds a threshold amount.

11. The method of claim 5, wherein the database system comprises a first processing cluster and a second processing cluster, wherein the first processing cluster performs the ordering, the selecting, and the performing, and wherein the method further comprises sending a query received at the first processing cluster to the second processing cluster to be performed to add to the capacity of the database system to perform refresh operations.

12. The method of claim 5, wherein the respectively determined performance benefits for the materialized views are based, at least in part, on predicted likelihood of arrival for a plurality of queries that utilize at least one of the plurality materialized views.

13. The method of claim 5, wherein the database system comprises a first processing cluster and a second processing cluster, wherein the first processing cluster performs the ordering and the selecting, and wherein the second processing cluster performs the performing the respective refresh operations to update the selected one or more materialized views responsive to a request sent from the first processing cluster.

14. One or more non-transitory, computer-readable storage media, storing program instructions that when executed on or across one or more computing devices cause the one or more computing devices to implement:
determining respective performance benefits for a plurality of materialized views already hosted by a database system, the respective performance benefits being obtained when using the materialized views for queries received at the database system;
ordering the plurality of materialized views according to the respective performance benefits;
selecting, according to the ordering, one or more of the plurality of materialized views already hosted by the database system to perform the respective refresh operations until no more of a capacity of the database system exists to perform an additional refresh operation for a different one of the plurality of materialized views; and
performing the respective refresh operations to update the selected one or more materialized views.

15. The one or more non-transitory, computer-readable storage media of claim 14, wherein, in determining the respective performance benefits for the plurality of materialized views hosted by the database system, the program instructions cause the one or more computing devices to implement:
determining, as respective initial performance benefits for the plurality of materialized views, respective differences in performance of a plurality of queries, received in a period of time, with and without using at least one of the plurality of materialized views;
discounting the respective initial performance benefits for the plurality of materialized views with respective prior performance benefits determined for the plurality of materialized views for a prior period of time; and
subtracting respective performance costs of refresh operations for the plurality of materialized views to determine the respective performance benefits for the plurality of materialized views.

16. The one or more non-transitory, computer-readable storage media of claim 15, wherein, in determining, as the respective initial performance benefits for the plurality of materialized views, the program instructions cause the one or more computing devices to implement dividing the respective initial performance benefit for two or more of the plurality of materialized views that are usable to perform a same query amongst the two or more materialized views.

17. The one or more non-transitory, computer-readable storage media of claim 14, storing further instructions that when executed by the at least one processor, cause the at least one processor to implement predicting, by the database system, spare capacity of the database system as the capacity of the database system to perform refresh operations.

18. The one or more non-transitory, computer-readable storage media of claim 14, wherein the ordering of the plurality of materialized views is modified according to a configuration for automatically refreshing materialized views received via an interface for the database system.

19. The one or more non-transitory, computer-readable storage media of claim 14, storing further instructions that when executed by the at least one processor, cause the at least one processor to implement:
- monitoring, by the database system, for a client workload event; and
- responsive to detecting a client workload event, stopping, by the database system, a refresh operation started for one of the plurality of materialized views to accommodate the client workload event.

20. The one or more non-transitory, computer-readable storage media of claim 19, wherein detecting the client workload event comprises detecting a particular type of client request.

* * * * *